(12) United States Patent  
Liu

(10) Patent No.: US 7,512,818 B2
(45) Date of Patent: Mar. 31, 2009

(54) CIRCUIT FOR PROTECTING MOTHERBOARD

(75) Inventor: Bai-Hong Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 131 days.

(21) Appl. No.: 11/750,347

(22) Filed: May 18, 2007

(65) Prior Publication Data

US 2008/0158759 A1 Jul. 3, 2008

(30) Foreign Application Priority Data

Dec. 29, 2006 (CN) .................... 2006 1 0064605

(51) Int. Cl.
*G06F 1/00* (2006.01)
*G06F 11/30* (2006.01)
*H02H 3/08* (2006.01)
*H02H 9/02* (2006.01)
*H02H 9/00* (2006.01)

(52) U.S. Cl. .................. 713/300; 713/310; 713/340; 361/58; 361/93.1

(58) Field of Classification Search .............. 713/300, 713/310, 340; 361/58, 93.1
See application file for complete search history.

(56) References Cited

U.S. PATENT DOCUMENTS 6,970,338 B2 * 11/2005 Ju ........................... 361/58

* cited by examiner

*Primary Examiner*—Stephen W Jackson
*Assistant Examiner*—Dharti H Patel
(74) *Attorney, Agent, or Firm*—Frank R. Niranjan

(57) ABSTRACT

A circuit for protecting a motherboard of a computer includes a first transistor (Q1) and a second transistor (Q2). A CPU with a CPU voltage terminal (10) configured for electrically connecting to a power supply is mounted on the motherboard. A gate of the first transistor is connected to the CPU voltage terminal. A source of the first transistor is connected to ground. A gate of the second transistor is connected to a drain of the first transistor through a node (11). The node is at low level when the computer is off. A drain of the second transistor is connected to a control signal terminal (PWRBTN#) from the computer. When the computer is turned on and the CPU voltage terminal is not connected to the power supply and is at low level, the control signal terminal turns to low level from high level to turn off the computer.

12 Claims, 2 Drawing Sheets

CIRCUIT FOR PROTECTING MOTHERBOARD

BACKGROUND OF THE INVENTION

1. Field of the Invention

The present invention relates to circuits, and more particularly to a circuit for protecting a motherboard from damage when a CPU (Central Processing Unit) on the motherboard of a computer is not supplied with a power source.

2. Description of Related Art

Recent technical innovations have created faster CPUs for speeding up the data processing rate of a computer. However, the faster CPUs need much greater power. Conventional motherboards cannot supply sufficient power to support these CPUs, thereby power supplies need to provide a special power cable for providing power directly to the CPU. At present, users often work with the motherboard themselves for removing or adding some components. In this situation, the power cables of the power supply connected to the motherboard sometimes need to be removed temporarily from the motherboard for easy reassembly. However, sometimes users overlook the power cable for the CPU, and plug it back in. If the computer is powered on in this case, some components on the motherboard will not be able to run. Further, the motherboard and/or its components may be damaged.

What is needed, therefore, is a circuit for protecting a motherboard from damage when a CPU on the motherboard of a computer is not supplied with a power source to ensure that the computer runs normally.

SUMMARY OF THE INVENTION

A circuit for protecting a motherboard of a computer includes a first transistor and a second transistor. A CPU with a CPU voltage terminal configured for electrically connecting to a power supply is mounted on the motherboard. A gate of the first transistor is connected to the CPU voltage terminal. A source of the first transistor is connected to ground. A gate of the second transistor is connected to a drain of the first transistor through a node. The node is at low level when the computer is off. A drain of the second transistor is connected to a control signal terminal of the computer which acts to change the work condition of the computer. When the computer is turned on and the CPU voltage terminal is not electrically connected to the power supply, the CPU voltage terminal is at low level to keep the first transistor turning off and the second transistor turning on, the control signal terminal goes from high to low level to turn off the computer.

Other advantages and novel features of the present invention will become more apparent from the following detailed description of preferred embodiment when taken in conjunction with the accompanying drawings, in which:

DETAILED DESCRIPTION OF THE INVENTION

Figure 1:
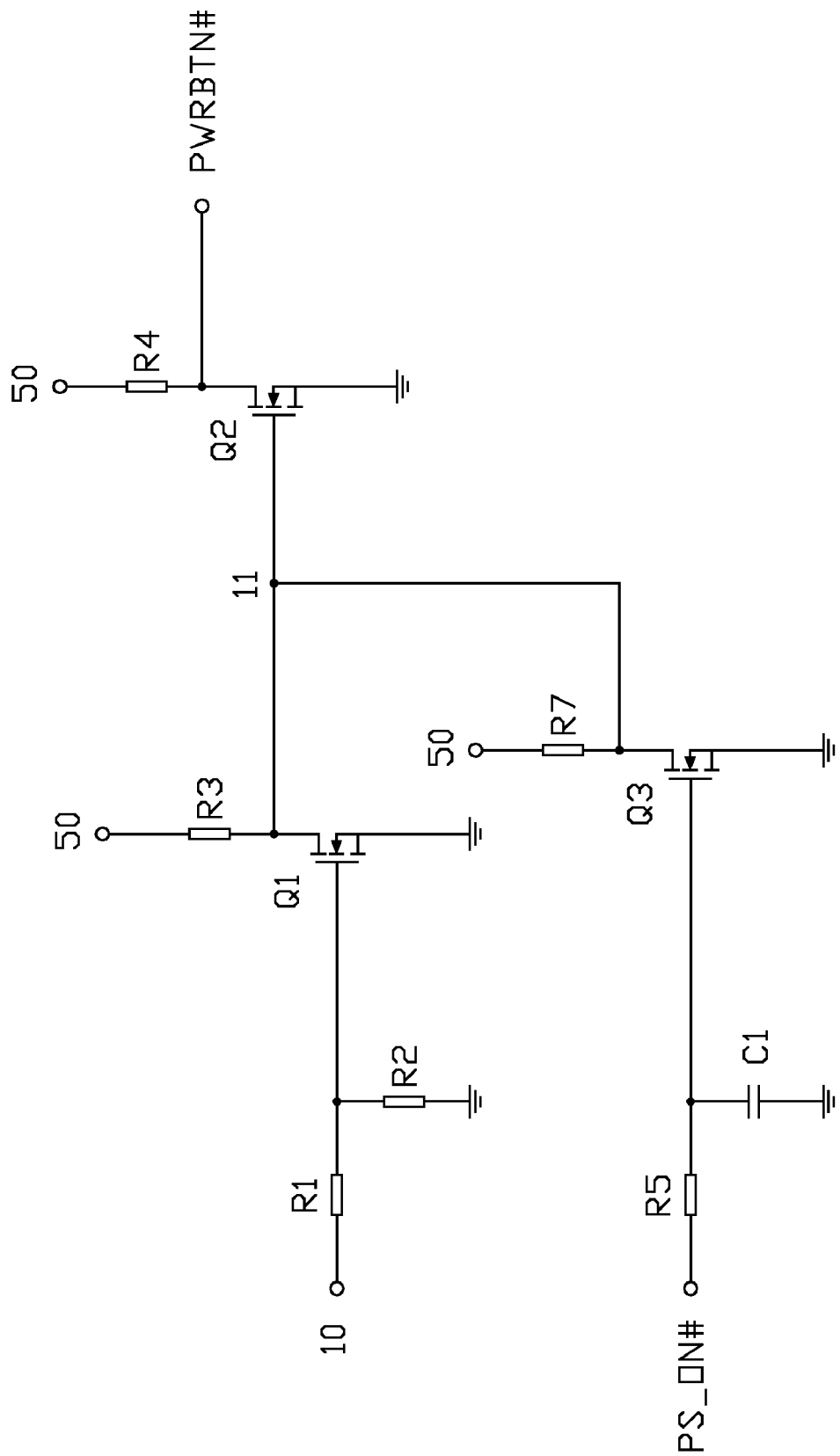
FIG. 1 is a diagram of a circuit for protecting a motherboard in accordance with a preferred embodiment of the present invention.

Referring to FIG. 1, a circuit of a preferred embodiment of the present invention for protecting a motherboard having a CPU thereon of a computer includes a CPU voltage terminal 10, a startup signal (PS_ON#) terminal, a control signal (PWRBTN#) terminal which is connected with a power button on the computer, a first transistor Q1, a second transistor Q2, and a third transistor Q3. The first, second, and third transistors Q1, Q2, Q3 of the preferred embodiment are field effect transistors (FETs). The CPU voltage terminal 10 is at high level when a power cable extending from a power supply for the CPU is connected to the CPU voltage terminal 10, and is at low level when the power cable is not connected to the CPU voltage terminal 10. The PS_ON# signal terminal is at high level when the computer is turned off, and is at low level when the computer is turned on. The PWRBTN# signal terminal is at high level in a normal condition. When the power button is pressed, the PWRBTN# signal terminal turns to low level. When the power button is released, the PWRBTN# signal terminal will return to high level immediately. When the PWRBTN# signal terminal turns to low level from high level, the work condition of the computer will change. For example, if the computer is off, the power supply will be started up and supply power to the computer, turning the computer on; if the computer is on, the power supply will be shut off, turning off the computer.

The CPU voltage terminal 10 is connected to a gate of the first transistor Q1 through a resistor R1. The resistor R1 and the gate of the first transistor Q1 are commonly connected to ground through a resistor R2. A drain of the first transistor Q1 is connected to a power source terminal 50 through a resistor R3. A source of the first transistor Q1 is connected to ground. A gate of the second transistor Q2 is connected to the drain of the first transistor Q1 through a node 11. A drain of the second transistor Q2 is connected to the power source terminal 50 through a resistor R4. The drain of the second transistor Q2 is also connected to the PWRBTN# signal terminal. A source of the second transistor Q2 is connected to ground. The PS_ON# signal terminal is connected to a gate of the third transistor Q3 through a resistor R5. The resistor R5 and the gate of the third transistor Q3 are commonly connected to ground through a capacitor C1. A drain of the third transistor Q3 is connected to the power source terminal 50 through a resistor R7. The drain of the third transistor Q3 is also connected to the node 11. A source of the third transistor Q3 is connected to ground.

When the computer is off, the CPU voltage terminal 10 inputs a low level signal to the gate of the first transistor Q1 through the resistor R1. The first transistor Q1 is turned off. The drain of the first transistor Q1 outputs a high level signal to the node 11. The PS_ON# signal terminal inputs a high level signal to the third transistor Q3 through the resistor R5, the third transistor Q3 is turned on. The drain of the third transistor Q3 outputs a low level signal to the node 11 thereby providing a low level signal to the gate of the second transistor Q2 via the node 11. Thus, the second transistor Q2 is turned off, and the drain thereof outputs a high level signal to the PWRBTN# signal terminal. Thereby the PWRBTN# signal terminal is always at high level when the computer is turned off.

Figure 2:
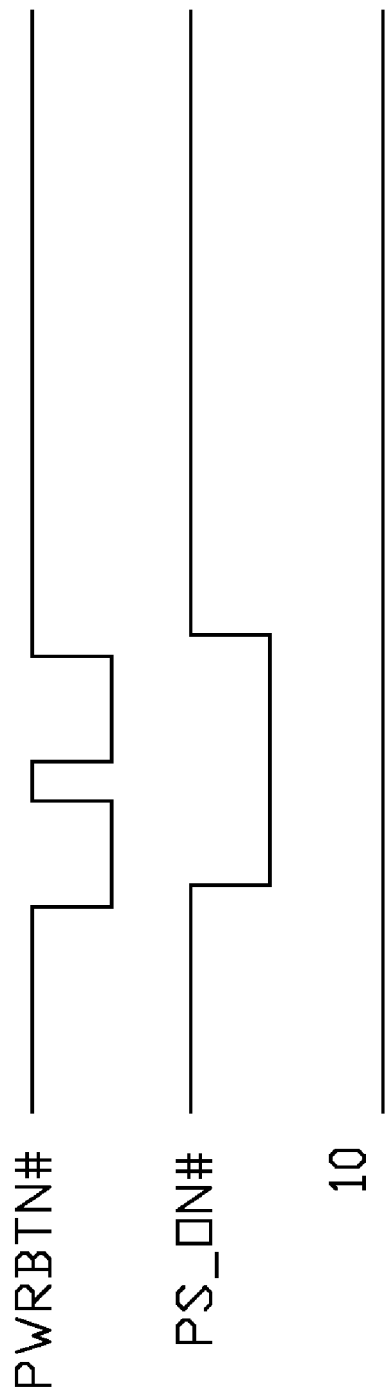
FIG. 2 is a sequence diagram of signals of the circuit when a computer is turned on and a power cable for a CPU is not connected to a CPU voltage terminal.

Referring to FIGS. 1 and 2, when the power button is pressed and the computer is turned on, the PWRBTN# signal terminal turns to low level from high level. When the power button is released, the PWRBTN# signal terminal will return to high level again. After the computer is turned on, the PS_ON# signal terminal inputs a low level signal to the gate of the third transistor Q3, the third transistor Q3 is turned off. The drain of the third transistor Q3 outputs a high level signal to the node 11. At this time, if the power cable for the CPU is connected to the CPU voltage terminal 10, that is, the CPU is supplied with a power source, the CPU voltage terminal 10 will input a high level signal to the first transistor Q1, the first transistor Q1 is turned on. The drain of the first transistor Q1 outputs a low level signal to the second transistor Q2, the second transistor Q2 is turned off. The drain of the second transistor Q2 outputs a high level signal to the PWRBTN# signal terminal, thereby the PWRBTN# signal terminal is always at high level and the computer stays on. If the power cable for the CPU is not connected to the CPU voltage terminal 10, that is, the CPU is not supplied with a power source, the CPU voltage terminal 10 will input a low level signal to the first transistor Q1, the first transistor Q1 is turned off. The drain of the first transistor Q1 outputs a high level signal to the second transistor Q2, the second transistor Q2 is turned on. The drain of the second transistor Q2 outputs a low level signal to the PWRBTN# signal terminal. The PWRBTN# signal terminal turns to low level from high level to turn off the computer, and then returns to high level immediately. Thereby the computer is turned off automatically to protect the motherboard.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for protecting a motherboard of a computer, a CPU with a CPU voltage terminal configured for electrically connecting to a power supply being mounted on the motherboard, comprising:
   a first transistor, a gate of the first transistor being connected to the CPU voltage terminal, a source of the first transistor being connected to ground; and
   a second transistor, a gate of the second transistor being connected to a drain of the first transistor through a node, the node being at low level when the computer is off, a drain of the second transistor being connected to a control signal terminal of the computer which acts to change the work condition of the computer,
   wherein when the computer is turned on and the CPU voltage terminal is not electrically connected to the power supply, the CPU voltage terminal is at low level to keep the first transistor turning off and the second transistor turning on, the control signal terminal turns to low level from high level to turn off the computer.

2. The circuit as described in claim 1, wherein the first transistor and the second transistor are field effect transistors (FETs).

3. The circuit as described in claim 2, wherein the drains of the first and second transistors are both connected to a power source terminal through a resistor respectively.

4. The circuit as described in claim 3, wherein the node is connected to a drain of a third transistor, a gate of the third transistor being connected to a signal terminal of the computer, the drain of the third transistor being connected to the power source terminal, a source of the third transistor being connected to ground, when the computer is off, the signal terminal is at high level; when the computer is on, the signal terminal is at low level.

5. The circuit as described in claim 4, wherein the signal terminal is PS_ON# signal terminal.

6. The circuit as described in claim 4, wherein the third transistor is a field effect transistor (FET).

7. The circuit as described in claim 1, wherein the control signal terminal being connected with a power button of the computer is at high level in normal condition, when the power button is pressed, the control signal terminal turns to low level from high level, when the power button is released, the control signal terminal will return to high level.

8. A circuit for protecting a motherboard of a computer, a CPU with a CPU voltage terminal being mounted on the motherboard, comprising:
   a first transistor, a gate of the first transistor being connected to the CPU voltage terminal which is configured for connecting with a power supply, a source of the first transistor being connected to ground,
   a second transistor, a gate of the second transistor being connected to a drain of the first transistor through a node, a drain of the second transistor being connected to a control signal terminal of the computer,
   a third transistor, a gate of the third transistor being connected to a startup signal terminal of the computer, a drain of the third transistor being connected to the node, a source of the third transistor being connected to ground,
   wherein when the computer is turned off, the startup signal terminal is at high level; when the computer is turned on and the CPU voltage terminal is at low level, the startup signal terminal is at low level and the control signal terminal turns to low level from high level to turn off the computer.

9. The circuit as described in claim 8, wherein the first transistor, the second transistor and the third transistor are field effect transistors (FETs).

10. The circuit as described in claim 9, wherein the drains of the first, second and third transistors are connected to a power source terminal through a resistor respectively.

11. The circuit as described in claim 8, wherein the control signal terminal keeps at high level in normal condition and changes the work condition of the computer when going to low level from high level.

12. The circuit as described in claim 11, wherein the control signal terminal is configured for electrically connecting with a power button of the computer, when the power button is pressed, the control signal terminal gets to low level from high level, when the power button is released, the control signal terminal will return to high level.

* * * * *